United States Patent Office 3,423,317
Patented Jan. 21, 1969

3,423,317
HIGH TEMPERATURE LUBRICANTS
Hyman R. Lubowitz, Redondo Beach, John R. Ogren, La Palma, and William P. Kendrick, Manhattan Beach, Calif., assignors to TRW Inc., Redondo Beach, Calif., a corporation of Ohio
No Drawing. Filed Nov. 21, 1966, Ser. No. 595,590
U.S. Cl. 252—37.2                2 Claims
Int. Cl. C10m 7/26

ABSTRACT OF THE DISCLOSURE

This invention relates to novel high temperature lubricants for use in metal extrusions and forgings. Poly-metal acrylates selected from the group consisting of polycalcium acrylates, polybarium acrylates, polymagnesium acrylates, and polymanganese acrylates are used in an aqueous media; as high temperature lubricants for applications where ordinary greases or soaps decompose or vaporize.

---

This invention is a result of work performed under Air Force Contract AF 33(615)-2749.

Refractory metals, such as titanium, molybdenum, tantalum, tungsten, niobium, and stainless steels which are employed at extreme service temperatures in advanced technological applications are among the least ductile of known metals. Fabrication of these refractory metals is best accomplished by extrusion because large uniform reductions can be effected in a state of almost total compression. However, extrusion at elevated temperatures has been accomplished with limited success. The principal problems have centered on excessive die wear and on billet-container lubrication. Greases and soaps which were employed in the prior-art are not entirely satisfactory because of pyrolysis and volatilization at the high temperatures experienced in the deformation of the metal. Other lubricants, such as phosphate bonded oxides, colloidal silica, or soap stone, are more stable at high temperatures, but do not exhibit adequate lubricity characteristics.

High temperature lubricants, according to this invention, are selected from poly-metal acrylate aqueous gels. Upon initial heating of these gels, water vapor is evolved which purges air from around the immediate vicinity of the work piece and the lubricating material. Water in the gel also acts as a solvating agent, imparting mobility to the polymer chains so that the polymer can coat the work piece. Further heating to high temperatures pyrolyzes the polymer to a protective metal oxide coating on a carbonaceous substrate. This particular mixture of pyrolysis products provides the lubricating surface that is essential to the high temperature metal extrusion and forging process.

In general, the poly-metal acrylates according to this invention are prepared by reacting acrylic acid and a metal carbonate to yield a metal acrylate, water, and carbon dioxide. Polymerization is accomplished by reacting the metal acrylate at a temperature of between approximately 100° and 105° C. in the presence of a peroxide free radical catalyst. The polymerized metal acrylate precipitates as a spongy mass which is dried and pulverized. Interpolymers prepared according to the above procedure have also been found to yield similarly outstanding lubricity properties.

EXAMPLE

Calcium acrylate monomer is prepared by dissolving 72.06 parts acrylic acid (M.P. 12–14° C.) in 500 parts water. Approximately 55.05 parts calcium carbonate is slowly added to the acrylic acid solution. The solution is continuously stirred during the addition of the calcium carbonate and for a period of four hours thereafter. The unreacted calcium carbonate is allowed to settle out of solution, and the supernatant liquid is filtered. The calcium acrylate monomer is precipitated from the filtered supernatant liquid by the addition of an equal volume of acetone. The precipitate is then filtered and washed with acetone three times and allowed to dry overnight.

Poly-calcium acrylate is prepared by mixing 10 parts of the dried calcium acrylate monomer with 100 parts of water. The solution is stirred until well-mixed, and then refluxed in a distillation flask for ten minutes. Approximately 2 drops of t-butyl perbenzoate per 100 ml. of solution is added to the distillation flask and refluxing is continued for an additional ten minutes. The flask is then allowed to cool to room temperature and the white rubber-like poly-calcium acrylate is removed. The precipitate is then washed, dried, and ground to the desired size.

When ready for use, the poly-metal acrylate powder is mixed with one to five times its weight of water. In addition, aqueous solutions of poly-vinyl alcohol ranging up to saturation have been found to be satisfactory carrier fluids. Excess water may be removed by simply pouring off the supernatant liquid, and the residue is a soft, putty-like gel.

Although numerous poly-metal acrylates are possible, only those which exhibited coefficients of friction below approximately 0.030 were considered. The following table presents comparative data on several of the poly-metal acrylates.

| Lubricant with water | Coefficient of friction | Time duration in seconds |
|---|---|---|
| Polycalcium acrylate | 0.008 | 2.1 |
| Polybarium acrylate | 0.022 | 5.2 |
| Polymagnesium acrylate | 0.011 | 4.2 |
| Polymanganese acrylate | 0.010 | 2.4 |
| Polycopper acrylate | 0.180 | 2.5 |
| Polycobalt acrylate | 0.052 | 1.1 |
| Polytin acrylate | 0.120 | 2.2 |
| Phosphate bonded oxides | 0.052 | 0.7 |
| olloidal Silica (cold die) | 0.056 | 1.0 |

From the above table it can be readily seen that poly-calcium acrylate, poly-barium acrylate, poly-magnesium acrylate, and poly-manganese acrylate exhibit coefficients of friction well below the suggested coefficient of friction limit of approximately 0.030.

In addition to the outstanding lubricity properties, the above-mentioned preferred aqueous gels may be readily and simply applied to the surfaces of extrusion dies. These gels may be brushed, pasted, or sprayed onto the die. Improved adhesion of the gels to the extrusion dies were found to occur in those cases wherein the aqueous gels contained poly-vinyl alcohol. In addition, the gels are non-flammable, and are non-toxic upon handling or imbibing. Furthermore, the gels do not decompose to produce gases or products which, in moderate amounts, will cause a health hazard to operating personnel.

We claim:
1. In a process for working high melting metals, the improvement comprising employing an aqueous gel of poly-metal acrylates selected from the group consisting of poly-calcium acrylate, poly-barium acrylate, poly-magnesium acrylate, poly-manganese acrylate, and interpolymers thereof as the high melting metal working lubricant.

2. A process according to claim 1 wherein the aqueous gel is saturated with a liquid selected from the group consisting of water and polyvinyl alcohol.

References Cited

UNITED STATES PATENTS

| | | | |
|---|---|---|---|
| 2,346,124 | 4/1944 | Dew | 252—49.5 |
| 2,635,067 | 4/1953 | Steiner et al. | 252—39 X |
| 2,875,166 | 2/1959 | Hopkins | 260—29.6 |
| 3,116,247 | 12/1963 | Moore et al. | 252—39 X |
| 3,123,563 | 3/1964 | Verley | 252—39 X |
| 3,267,035 | 8/1966 | Tillman | 252—56 X |
| 3,354,084 | 11/1967 | Katzer | 260—29.6 X |

FOREIGN PATENTS 371,041  4/1932  Great Britain.

DANIEL E. WYMAN, *Primary Examiner.*

W. H. CANNON, *Assistant Examiner.*

U.S. Cl. X.R.

72—42; 252—40.7, 49.3; 260—29.6